Figure 1:
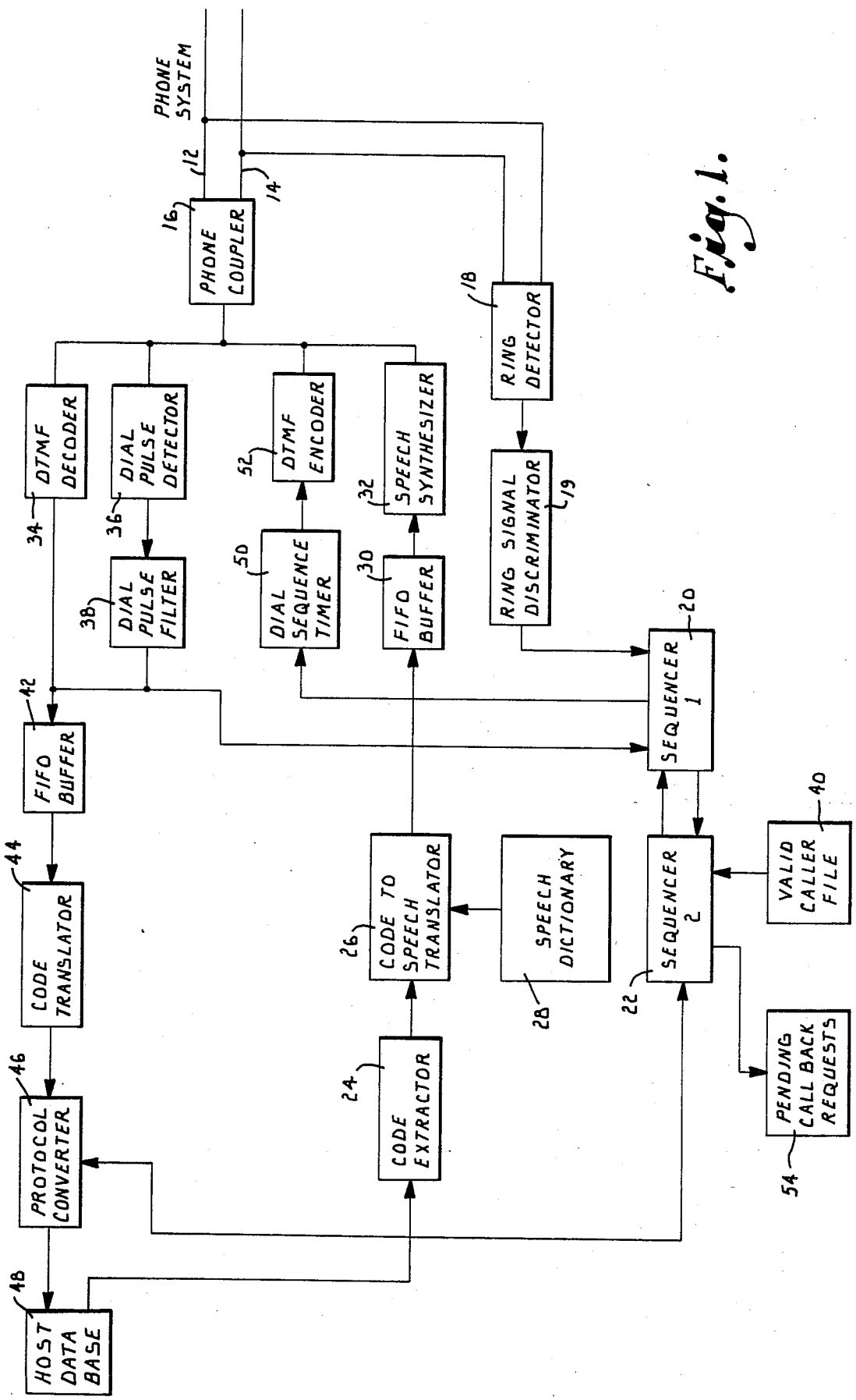

United States Patent [19]

Hilleary et al.

[11] Patent Number: 4,577,062

[45] Date of Patent: Mar. 18, 1986

[54] METHOD FOR DISPENSING INFORMATION

[75] Inventors: Thomas N. Hilleary, Johnson County, Kans.; Robert D. Fulton, Jackson County, Mo.

[73] Assignee: Butler National Corporation, Lenexa, Kans.

[21] Appl. No.: 529,116

[22] Filed: Sep. 2, 1983

[51] Int. Cl.[4] .......................................... H04M 11/00
[52] U.S. Cl. .................................. 179/2 A; 179/2 R; 179/6.08; 179/18 BE
[58] Field of Search ................... 179/2 R, 2 A, 2 AM, 179/2 CA, 2 DP, 6.03, 6.07, 6.08, 6.11, 18 B, 18 BE; 340/825.26, 825.27; 381/43

[56] References Cited

U.S. PATENT DOCUMENTS

| | | | |
|---|---|---|---|
| 3,082,402 | 3/1963 | Scantlin | 179/2 A |
| 3,347,989 | 10/1967 | Riddell | 179/2 A |
| 3,381,278 | 4/1968 | Knoll et al. | 179/6.08 X |
| 3,716,835 | 2/1973 | Weinberg et al. | 179/2 DP X |
| 3,928,724 | 12/1975 | Byram et al. | 381/43 |
| 3,976,840 | 8/1976 | Cleveland et al. | 179/2 DP |
| 4,320,256 | 3/1982 | Freeman | 179/6.08 X |
| 4,389,546 | 6/1983 | Glisson et al. | 179/2 A X |
| 4,489,438 | 12/1984 | Hughes | 179/2 A X |

OTHER PUBLICATIONS

*Digital Processing of Speech Signals,* Rabiner and Schafer, p. 476, Prentice Hall, NJ.

Primary Examiner—W. J. Brady
Attorney, Agent, or Firm—Kokjer, Kircher, Bradley, Wharton, Bowman & Johnson

[57] ABSTRACT

A method of dispensing particular information automatically from a changing data source to any particular user. The user accesses the information by dialing the dissemination service through his telephone equipment. The caller's call and subsequent dialed digital sequences, corresponding by prearrangement to specific information requests, are automatically processed. The information from a data base is transmitted to the caller by audible synthesized speech signal through the caller's telephone. Upon request by the caller, the call is automatically transferred to a particular telephone corresponding to prearranged data relevant to the particular caller. Data in the data base may be monitored and a call to a user automatically initiated in the event a particular item reaches a predetermined parameter.

7 Claims, 1 Drawing Figure

METHOD FOR DISPENSING INFORMATION

This invention relates to the furnishing of information and more particularly to a method for the furnishing of relevant particular information to a widely dispersed group of inquirers from a large and frequently changing collection of such information.

Frequently, information can be collected at a central location, generalized and may then be easily dispensed to a great many users whose needs are more or less in common. Weather forecasts and news items are examples which may fit this description. On the other hand, some types of information may be collected relatively easily at a source, but the diversity of the interests in the group of potential users dictates that only very particular parts of the collected information is highly relevant to any one of the large group. The problem is greatly increased if this group of potential users is dispensed widely geographically.

A particular example of this latter category of information is securities or stock market information. Timely information of current securities prices is highly important to many investors located throughout the entire world. Yet each investor's immediate interest may be only in a limited number of security prices at a particular time.

Heretofore, the dissemination of this type of information has typically remained relatively cumbersome and has often involved the use of considerable manpower. The users of stock market information are often required to either be physically present at centralized locations where such information is collected and dispensed or they must rely on the relay to them of such information by someone who is at the centralized location. Given the wide dispersal of the group, either requirement imposes a substantial burden on the user and is unhandy at best.

Further, the information collected comprises unique data pertaining to each of a large number of particular securities. Commonly, this information is sequentially dispensed by display or otherwise. The potential user must wait until the data pertinent to the security or securities in which he has a particular interest reaches its respective turn in the dissemination sequence before that particular information is available to him. The time involved in the dissemination of information in which the user has little or no interest is more or less wasted as to him.

Another example where the ready availability of particularized information from a changing data source might likely be useful to a widely diverse and geographically dispersed group would be information pertaining to freight shipments. Truckers at their primary destinations are frequently interested in the availability of freight shipments to be hauled on their return trips.

One further example is the dissemination of airport traffic and scheduling information. Presently, the details of arrival and departure times, boarding gate, and the like for any particular airline flight are posted at centralized locations at an airport. An individual not at the airport is able to access this information only by calling someone at a location where the information is assembled, who manually relays it to the caller. Much time and effort could be saved if an individual could access such information relative to any particular flight automatically through his own telephone from any geographic location.

Other similar examples might be suggested.

Accordingly, it is a primary object of the present invention to provide a method which renders particular information from a collection of such information readily and conveniently available to a widespread and diverse group of potential users.

It is another object of the present invention to provide a method for rendering such information quickly and easily available to the user over his existing telephone equipment.

still another object of the invention is to provide a method which takes advantage of currently available technology to minimize or even eliminate the need for human operators to process and furnish timely information to a user without the need for the investment by the user in expensive, specialized equipment.

Another object of the present invention is to provide a method whereby users of a specialized group may be furnished relevant information automatically while requests by potential users who do not belong to the group are rejected and the information is not furnished.

A yet further object of the instant invention is to provide a method of furnishing relevant particular information from a collection thereof rapidly upon a request therefor, without the necessity for the user to await the transmittal of other information from the collection or until the requested particular information reaches its respective sequential turn in an information transmitting process.

These and other important aims and objectives of this invention will be further explained or will become apparent in the following explanation and description of the drawings in which the single FIGURE is a data flow diagram which illustrates the functions of the preferred equipment employed to carry out the method of the invention.

The method which is the subject of this invention may be carried out with the use of apparatus and techniques which, individually, are well known and commercially available to those skilled in the art. The data flow diagram of the drawing illustrates the functions of the communications equipment presently preferred for carrying the method of the invention into effect. The lines on the diagram are intended to illustrate the flow path for the transmission of information between the several functional components and do not necessarily represent actual physical interconnections. In some cases, a single transmission line may represent one or a plurality of interconnections for accomplishing the intended information transmission. In other cases the information may be transmitted between functional components without the necessity for physical interconnection between the two.

Inasmuch as the functional components are well known and readily available, it is not considered necessary to burden the disclosure with detailed explanation of the components other than a description of the respective functions which they perform. a veritable host of published data is available to the user of the method of this invention to explain the details of components capable of performing the functions described. Many of the functions of the system could be performed by a computer and it is likely that such would be employed for this purpose. The disclosure should not be considered limited to any such particular equipment, however, and its suffices to say that the invention contemplates any equipment or apparatuses capable of carrying out these functions.

The equipment of the dispenser of the information pursuant to this method is connected to telephone lines 12 and 14 by a coupler 16. A function of coupler 16 is to permit the connection of auxiliary equipment to an existing telephone line in a manner which does not interfere with the performance of the telephone equipment and which meets the specifications of the telephone company. The overall function of this equipment is to protect the telephone line. Lines 12 and 14 are connected to a ring detector 18 having the function of detecting when the number assigned to the information disseminating service has been called and to notify a sequencer 20 of that event. A ring signal discriminator 19 is interposed in the data path between the detector 18 and the sequencer 20 to identify those particular signals from the detector which should trigger action by the sequencer.

Sequencer 20 controls the occurance of a number of events. Among its functions is that the reception of a signal from the ring detector prompts the sequencer to cause the answering of the telephone to cause the response containing a message to be sent to the user, and the reception of a request for information from the user. To this end, sequencer 20 communicates with a sequencer 22 in the central system controller. Like sequencer 20, sequencer 22 also performs a number of functions in the automatic dissemination of information to a user. Thus, upon the information that the station has been called which is relayed through sequencer 20, sequencer 22 initiates a signal through a code extractor 24 to a code to speech translator 26. Extractor 24 functions to separate from a plurality of data and signals available at any particular time, those signals which pertain to the particular communication with the user at a particular time. These selected signals are translated by the code to speech translator 26 into speech data calling upon a reservoir of coded speech fragments contained in a speech dictionary 28. This speech data is fed to a FIFO buffer 30 the function of which is to organize the speech data and feed it at a rate which can be utilized by the caller. The output from buffer 30 is fed through a speech synthesizer 32 where the data is converted into an audio signal transferred through coupler 16 to the user's telephone apparatus.

It is contemplated that the system controller, handling a plurality of incoming calls from a plurality of incoming line cards, some calls simultaneously with others, will operate asynchronously and at a much higher rate of speed than the operations carried out by the line card. It is for this reason, primarily, that it is necessary to have the two separate sequencers 20 and 22, respectively.

In the method of this invention, the audio speech signal which is automatically transmitted to the user upon the receipt of a telephone call to the information station may take the form of a greeting to the caller followed by an invitation for the caller to transmit some form of identification signal to the apparatus. For example, if the information is being furnished to members of a select group such as to the subscribers of a particular information service, it will be necessary that the caller be verified as a member of this group. It is, of course, contemplated that the information might be dispensed pursuant to this method to any caller requesting the information. In such case, the identification step may be omitted.

Assuming that the information dispensed by the method of this invention is, for example, securities information such as stock market quotations or the like, the audio signal transmitted to the caller might invite the caller to dial a prearranged digital sequence on his existing telephone apparatus to identify the caller as belonging to the subscriber group. The prearranged dialed sequence by the caller would generate a signal which would pass through phone coupler 16 to a dial tone multiply frequency detector 34 if the user is using a telephone equiped with a dial tone keyboard. It would be transmitted to a dial pulse detector 36 in the event that the user's telephone is equipped with a rotary dial. In the latter event, the dial pulse is converted through a filter 38 to a form compatible with dial tone equipment.

In either event, the code pulses initiated by the user by dialing the prearranged sequence are transmitted to sequencer 20 and to sequencer 22 in the system controller. The latter compares the signal with data contained in a valid caller file 40 to verify that the caller is a subscriber of the service. In any event, sequencer 22 initiates a message to the caller through extractor 24, translator 26, buffer 30 and synthesizer 32 as has previously been described. If it has been determined that the call is not from a valid subscriber the nature of the signal will result in an automatic synthesized message to the caller that the digital sequence dialed by him is not correct for identification purposes. It may invite one or more successive tries which, if not successful within a predetermined time period, the sequencer 22 will cause automatic termination of the call. On the other hand, if the original or successive signals dialed by the caller result in the identification of the caller as a member of the group of subscribers, the sequencer may relay a message as has been previously described inviting the user to dial any of a number of prearranged dialing sequencing on his telephone apparatus corresponding to any of a number of items of information desired by the user. This invitation is, of course, relayed to the user by sequencer 22 through extractor 24, translator 26, buffer 30 and synthesizer 32 so that the communication to the user is an audible synthesized voice signal.

Assuming that the caller is interested in stock market quotation information, he may dial a prearranged digital sequence on his telephone which corresponds with a particular security. The digital sequence so dialed is fed through a buffer 42 to a code translator 44 in the system controller. These signals are, in turn, fed through a protocol converter 46 which converts the signals into a form compatible with a host data base 48 which may be located at some remote site. The host data base is a reservoir of a plurality of bits of information.

The stored information could take any of a multitude of different forms. However, if the system is to be used for the dissemination of relevant securities market information, it is contemplated that the host data base would contain relevant information with respect to each particular security. Thus, the data base would contain, for each security, at least the quoted stock price, the offered stock price, the number of shares trading and the like. Such information in the data base would obviously be updated at frequent intervals.

Assuming the user dialed a particular digital sequence corresponding to a particular stock, the signal transmitted from the protocol converter to the host data base would contain a request for the latest information in the date base with respect to that stock. The information, when returned from the data base is then sent to the code extractor 24. This data would be sent through translator 26, buffer 30 and synthesizer 32 to be transmitted as an audible speech signal to the caller.

Sequencer 20 could follow the transmission of such signal to the caller by the initiation of a subsequent signal inviting the caller to place a subsequent request for more information. The caller could initiate a second request for information by dialing a prearranged dialed sequence corresponding to another security. This process could be repeated for a predetermined number of times or until the invitation to the caller to dial another sequence was followed by the elapse of a predetermined time interval without such sequence having been dialed. The sequencer would then automatically terminate the call.

It is also contemplated by the method of this invention that a user of particularized information such as stock market quotation information may desire to speak personally to a third party, such as to his personal broker, immediately upon being advised of the current market quotation for a particular stock or stocks. Accordingly, rather than having sequencer 20 automatically terminate the call when a predetermined time period has elapsed following the last invitation to the caller to dial a sequence corresponding to a given stock with no dial sequence having been received, sequencer 20 may initiate an invitation to the caller to dial a prearranged sequence indicating a desire to have the telephone call forwarded to a third telephone. This dialed sequence is received through either the DTMF or the dial pulse detector and is transmitted to sequencer 20 and sequencer 22. The latter may obtain data from file 40 indicating the personal broker desired by the subscriber and can initiate the switching of the call to that particular broker through sequencer 20, a dial sequence timer 50 and DTMF encoder 52. Further, sequencer 20, once the transfer of the call to a third telephone has been completed, can automatically terminate the previous connection to permit a direct and private conversation between the caller and his broker.

It is also within the contemplation of this invention to provide for the automatic placement of a return call to the caller of the system pending the information in the host data base particular to a given item reaching a predetermined parameter. For example, it may be desired to couple with the automatic synthesized voice information disseminating service of this invention the further service of monitoring the value of a particular stock, for example, and initiating a call to the subscriber of the system to advise of the stock having reached that parameter. This is accomplished by the transmission as has been heretofore described to the caller of a synthesized voice message inviting the caller to indicate by prearranged dialing sequence his desire for such service. Once the signal from the dialing of such sequence is received, the data pertaining to the signal is filed in a pending call back request file 54. The data in the host data base is continuously or periodically monitored as required with respect to the parameter requested by the caller. Once the parameter reaches the predetermined value, a call to the caller is automatically initiated by the system and a synthesized voice message is transmitted to the caller advising of the attainment of the parameter. It is, of course, apparent that this latter service may also be coupled with an invitation to the caller to have the call transferred to the caller's personal stock broker and, if the caller indicates his desire by prearranged dialed sequence signal, the call can be automatically transferred.

While the description of this method has been more or less specific to the dissemination of information pertaining to stock market quotations for that is a particular use which is considered highly desirable, it will be readily understood that there are other desirable uses for the method. It is not intended that the method of this invention be limited to stock market quotation services. Rather, the method should be considered broadly available for use where it is desirable for the automatic dissemination to a user at his particular geographic location of particular parts of a large body of data which is collected at a remote location.

We claim:

1. A method of automatically furnishing information through existing telephone circuits, said method comprising:

automatically receiving an incoming call and immediately automatically transmitting an invitation for the caller to enter through the caller's telephone dialing apparatus a prearranged dialing sequence identifying the caller as a recipient of the information;

automatically receiving and comparing the dialed sequence with stored data to verify the authorized status;

after verifying said status, automatically transmitting a signal to the caller inviting the entry through the caller's telephone dialing apparatus of a new dialing sequence corresponding to a particular information desired;

receiving the entry made by the caller and recalling data from a changing data source corresponding to said particular information;

automatically transmitting to the caller by synthesized voice the particular information recalled from the data source;

continuing the automatic transmission of repetitive invitations to the caller to enter dialing sequences corresponding to additinal particular information, receiving the entries, recalling data corresponding to the respective particular information and automatically transmitting relevant information to the caller by synthesized voice until a predetermined time elapses after an invitation to enter is given without a subsequent entry having been made by the caller and without the caller breaking the circuit; and automatically transferring the call to a third telephone upon the elapse of said predetermined time interval.

2. The method of claim 1, wherein is included the step of automatically comparing the recipient identification dialed entry with data identifying a third telephone prearranged to correlate with the caller prior to the calling of said third telephone, and wherein the telephone called is that which correlates with the caller.

3. The method of claim 2, wherein the circuit with the caller is automatically terminated when the third telephone is answered to permit a private conversation between the caller and the operator of said third telephone.

4. A method of automatically furnishing securities market information through existing telephone circuits to subscribers of an information service, said method comprising:

automatically transmitting an invitation for the caller to enter through the caller's telephone dialing apparatus a prearranged dialing sequence identifying the caller as a subscriber of the service;

automatically receiving and comparing the sequence dialed by the caller with stored data to verify the status of the caller as a subscriber of the service;

upon verification of the subscriber status, automatically transmitting a signal inviting the entry by the caller through the caller's telephone dialing apparatus of a new prearranged sequence corresponding to a particular security;

automatically receiving the new sequence dialed by the caller and automatically recalling data from a changing security data source corresponding to said particular security;

automatically transmitting to the caller by synthesized voice security market information relevant to said security recalled from the data source; and continuing the automatic transmission of invitations to the caller to enter dialing sequences corresponding to additional securities, receiving the entries, recalling data corresponding respectively to such additional securities, and transmitting information relating thereto until the caller interrupts the telephone circuit or until a predetermined time elapses after an invitatin to enter is transmitted without a subsequent entry having been dialed by the caller;

automatically transmitting to the caller an invitation to enter a prearranged dialing sequence corresponding to a call transferring service upon the elapse of a predetermined time after an invitation to the caller to enter a dialing sequence corresponding to an additional security is transmitted and no responsive entry is made and the circuit is not interrupted;

automatically receiving an entry dialed by the caller; and automatically transferring the call to a third telephone in response to said dialed entry.

5. The method of claim 4, wherein is included the steps of automatically comparing the caller's subscriber identification dialed sequence with pre-compiled data identifying a particular third telephone of a security broker preferred by the caller, and automatically transferring the caller's call to the telephone of the caller's preferred broker.

6. A method of furnishing information through existing telephone circuits, and automatically placing the recipient of the information in communication with the operator of a third telephone, said method comprising:

automatically receiving an incoming call and automatically transmitting a signal to the caller inviting the entry through the caller's telephone dialing apparatus of a new dialing sequence corresponding to a particular information desired;

receiving the entry made by the caller and recalling data from a data source corresponding to said particular information;

automatically transmitting to the caller the particular information recalled from the data source;

continuing the automatic repetitive transmission of relevant information responsive to caller's entries until a predetermined time elapses after an invitation to enter without a subsequent entry having been made by the caller and without the caller having broken the circuit; and automatically transferring the call to a third telephone upon the elapse of said predetermined time interval.

7. The method of claim 6, wherein the circuit is automatically terminated when said third telephone is answered to permit a private conversation between the caller and the operator of said third telephone.

* * * * *